US006547430B2

(12) United States Patent
Dinant

(10) Patent No.: US 6,547,430 B2
(45) **Date of Patent: *Apr. 15, 2003**

(54) LIGHTING OR SIGNALING DEVICE FOR A VEHICLE, WITH A THERMAL SCREEN

(75) Inventor: Franck Dinant, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/842,339

(22) Filed: Apr. 25, 2001

(65) Prior Publication Data

US 2002/0003710 A1 Jan. 10, 2002

(30) Foreign Application Priority Data

Apr. 28, 2000 (FR) .......................................... 00 05494

(51) Int. Cl.[7] .................................................. B60Q 1/04

(52) U.S. Cl. ........................ 362/547; 362/373; 362/294

(58) Field of Search ................................ 362/294, 516, 362/519, 546, 547, 548, 549, 373, 433, 390, 456

(56) References Cited

U.S. PATENT DOCUMENTS

| | | | | |
|---|---|---|---|---|
| 4,612,607 A | | 9/1986 | Segoshi et al. | |
| 4,709,305 A | * | 11/1987 | McMahan .................... | 362/61 |
| 5,113,320 A | * | 5/1992 | Haydu ......................... | 362/61 |
| 5,702,173 A | | 12/1997 | Kawamura | |

FOREIGN PATENT DOCUMENTS

| | | |
|---|---|---|
| DE | 3620800 | 12/1987 |
| FR | 2514466 | 4/1983 |
| GB | 2022234 | 12/1979 |
| GB | 2070755 | 9/1981 |
| GB | 2130353 | 5/1984 |

* cited by examiner

*Primary Examiner*—Sandra O'Shea
*Assistant Examiner*—Hargobind S. Sawhney
(74) *Attorney, Agent, or Firm*—Morgan & Finnegan LLP

(57) ABSTRACT

A lighting or signaling device for a vehicle comprises a casing (2), glazing (8) and an intermediate piece (6) linking the glazing to the casing. It further includes a screen (112) extending forwards from an upper region of the casing towards the glazing.

9 Claims, 11 Drawing Sheets

LIGHTING OR SIGNALING DEVICE FOR A VEHICLE, WITH A THERMAL SCREEN

FIELD OF THE INVENTION

The invention relates to a lighting or signaling device for a vehicle.

BACKGROUND OF THE INVENTION

Such a device is known from the document EP-0 847 894, comprising a casing carrying a lamp, glazing and an intermediate piece linking the glazing to the casing. The casing and the intermediate piece are generally made of plastic. However, it is observed that the heat given off by the lamp heats up the air inside the device, and that this hot air rises so as to heat up the upper part of the intermediate piece. This rise in temperature, though, could, in certain applications, for example in the case of a fog lamp, cause deformation of the intermediate piece and dislocating of the glazing. It is known that, especially in a fog lamp, the temperature of certain regions may reach 200° C.

DISCUSSION OF THE INVENTION

An object of the invention is to provide a lighting or signaling device in which the intermediate piece is at less risk of being deformed.

With a view to achieving this object, a lighting or signaling device for a vehicle is proposed, according to the invention, including a casing, glazing and an intermediate piece linking the glazing to the casing, further including a screen extending forwards from an upper region of the casing towards the glazing, the screen being linked directly to the casing so forming a single piece with the casing.

Thus, the screen receives the rising hot air. A fraction of the heat is therefore picked up by the screen and no longer by the intermediate piece. Hence the risk of the latter being deformed is reduced. As for the screen, it can be deformed to a large extent without impairing the functioning of the device.

The device according to the invention could, moreover, feature at least any one of the following characteristics:

- the screen is molded integrally with the casing;
- the screen and the casing each feature an inner face and an outer face, at least one of the inner or outer faces of the screen being in the extension of the corresponding face of the casing;
- the screen has a generally cylindrical shape;
- the screen extends over an angular sector less than 90° around an axis of the device.

Advantageously, the device comprises a back wall made of plastic, a lamp holder fixed to the back wall and a metal plate fixed to the back wall.

Thus, the metal plate reinforces and stiffens the back wall. The mechanical resistance of the wall, even under the effect of the heat, is thus increased. Moreover, the metal plate receives some of the heat from the back wall, or, what is more, even receives the heat from the lamp directly, and dissipates it into the air surrounding the plate (by forming a radiator) which keeps the back wall at a relatively low temperature. Thus reinforced, and heated less, the back wall is less deformed. Hence the positioning of the lamp with respect to the reflector is preserved, so that the correct beam is obtained.

Advantageously, the device includes a reflector and a cradle linking the reflector to the casing and featuring an aperture in its upper part.

Thus, the aperture corresponds to the region of the cradle which otherwise would be most exposed to the heat. Moreover, the aperture allows a certain amount of dilation of the cradle. The thermal behavior of the cradle is thus enhanced, which promotes correct positioning of the reflector with respect to the lamp. Moreover, this aperture reduces the volume of the cradle and gives it an overall size allowing certain kinematics for fitting the cradle with respect to the reflector, such as assembly by pivoting, for example, which otherwise would be prohibited. Moreover, this aperture achieves an indexing effect for the correct fitting of the cradle into the device. Finally, it gives rise to a reduction in material. This results in a saving in weight and in cost, which is all the more important since high-grade plastics, which have good heat resistance but are often expensive, are usually used for this type of piece.

Advantageously, what is involved is a headlight.

Advantageously, what is involved is a fog lamp.

Other characteristics and advantages of the invention will emerge further from the following description of a preferred embodiment and of variants which are given by way of non-limiting examples.

DESCRIPTION OF THE PREFERRED EMBODIMENTS OF THE INVENTION

Figure 1:
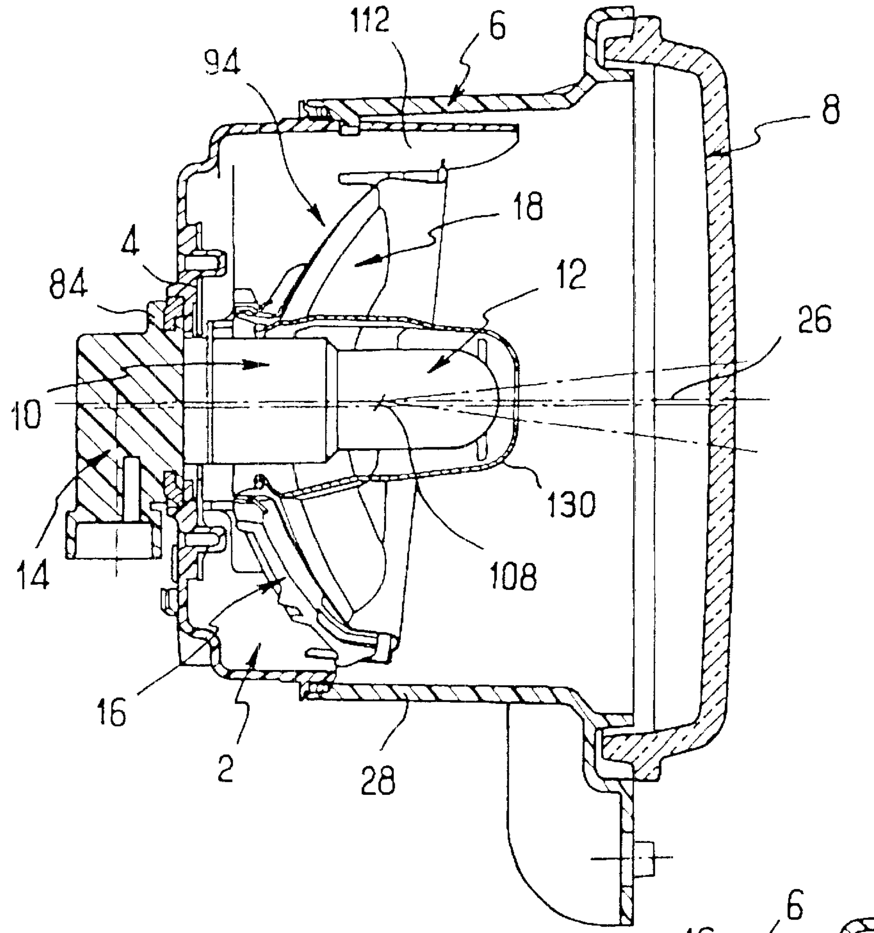
FIG. 1 is a sectional view along a vertical axial plane of a headlight according to the invention.
Figure 2:
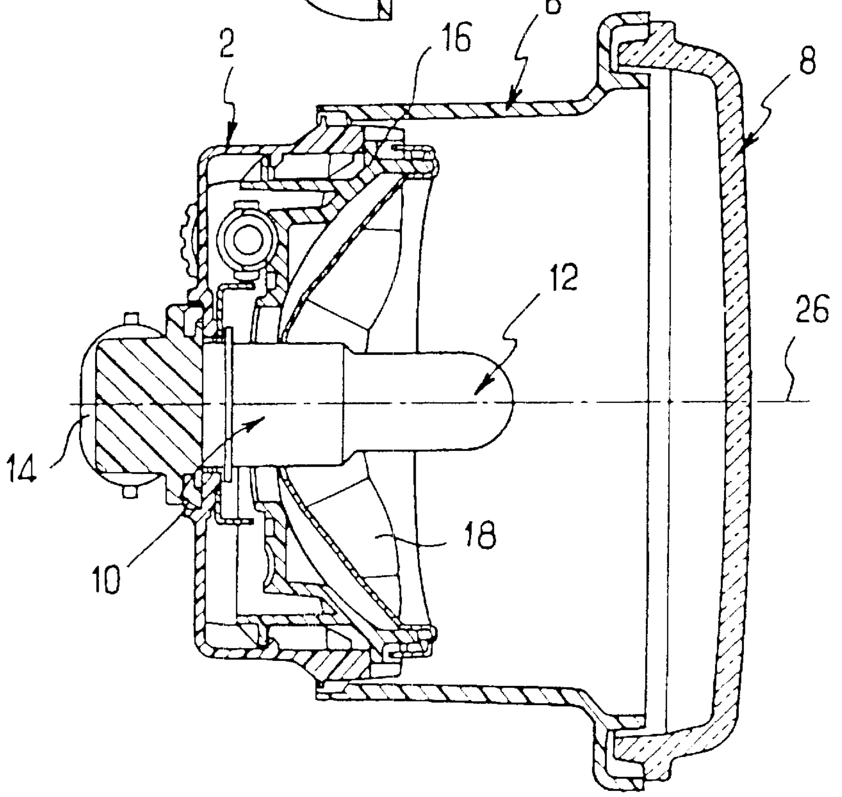
FIG. 2 is a sectional view of the headlight of FIG. 1 along a horizontal axial plane.
Figure 3:
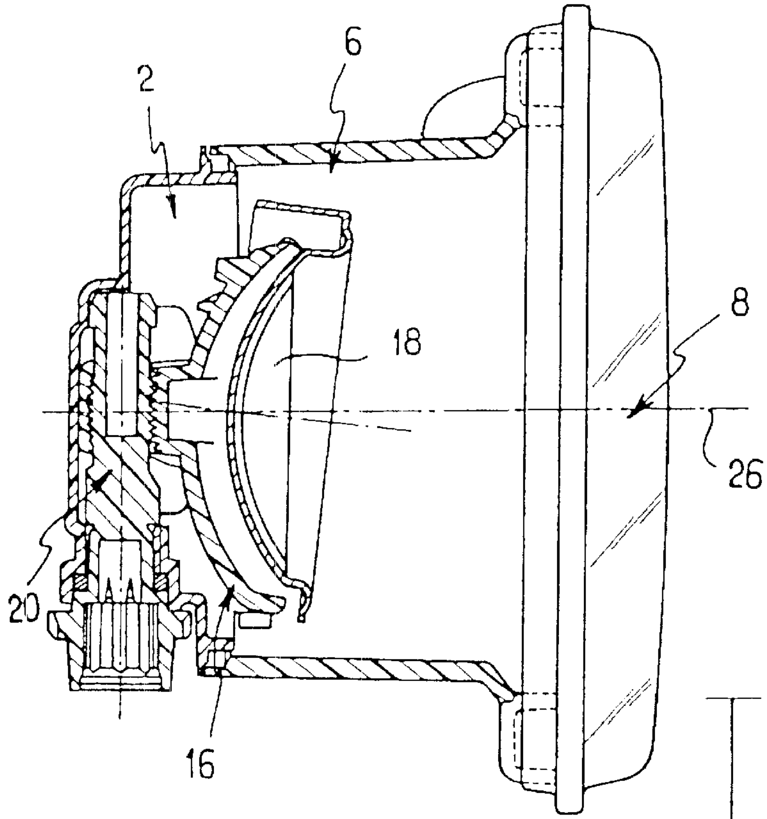
FIG. 3 is a sectional view of the headlight of FIG. 1 along a vertical plane passing through the screw for adjusting the inclination of the reflector.

Referring to FIGS. 1 to 3, the embodiment of the invention here is a fog lamp. It includes a rear casing 2, a sheet metal plate 4 fixed to the casing, an intermediate piece 6 fixed to the casing, front glazing 8 fixed to the intermediate piece 6. The headlight includes a lamp holder 10 fixed to the casing and to the sheet metal plate, a lamp 12 and a connector 14 which are fixed to the lamp holder. It includes a cradle 16 fixed to the casing and a reflector 18 fixed to the cradle. The headlight further includes an adjusting screw 20 and an adjusting knob 22 fixed to the screw as illustrated especially in FIG. 4.

These elements will now be described more precisely.

Figure 7:
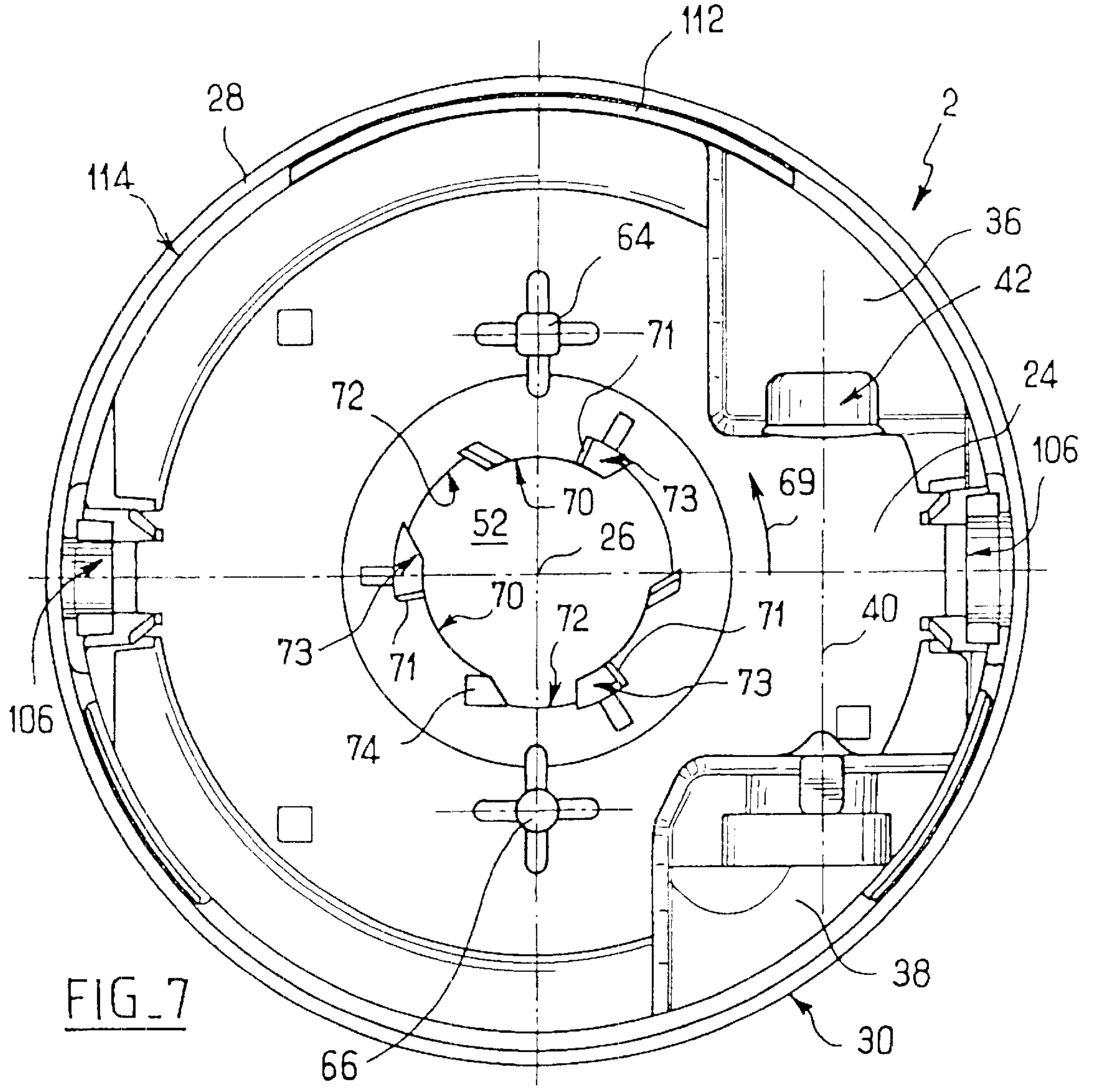
FIGS. 7 and 8 are a front view and a view in axial section along a horizontal plane of the casing of the headlight of FIG. 1.
Figure 8:
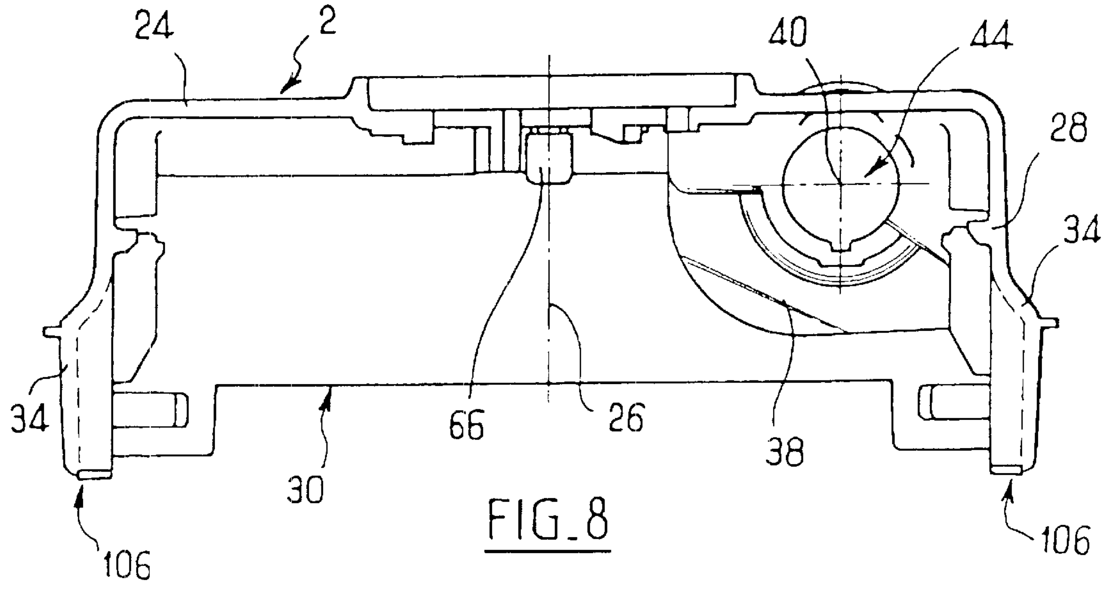
Figure 9:
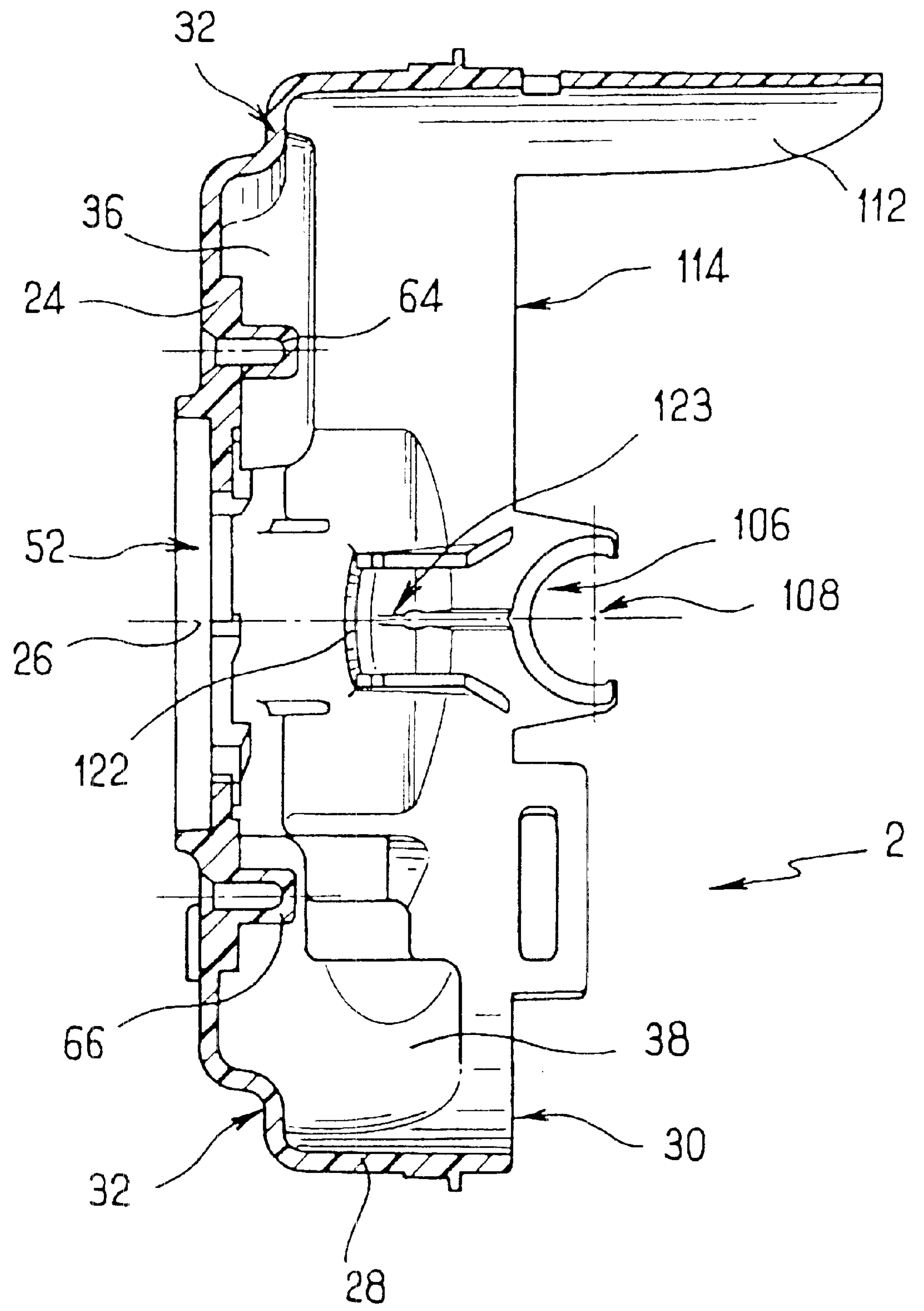
FIG. 9 is a view in axial section along a vertical plane of the casing of FIG. 7.

Referring to FIGS. 7 to 9, the casing 2 includes, in essence, a generally flat back wall 24 perpendicular to a horizontal axis 26 of the lamp and a cylindrical side wall 28 extending forwards from the back wall. The side wall 28 features a circular front edge 30 lying within a plane perpendicular to the axis 26. As can be seen in FIG. 9, the casing features shoulders 32 at certain places on the junction between the back wall 24 and the side wall 28. Moreover, the side wall 28 is flared at certain places 34, as illustrated in FIG. 8.

Referring especially to FIG. 7, at the junction between the back wall 24 and the side wall 28, the casing 2 features two straight upper 36 and lower 38 swellings situated respectively in the first and fourth quadrants in front view. These swellings have the general shape of a right-angled isosceles triangle in front view in FIG. 7. They define two projecting portions within the headlight. The two swellings 36, 38 feature two orifices facing one another, with a common axis 40 perpendicular to the axis 26, not intersecting it, and vertical. The orifice 42 of the upper swelling 36 is open downwards, blind upwards but open towards the front, while the orifice 44 of the lower swelling is open upwards and downwards but closed laterally.

Figure 23:
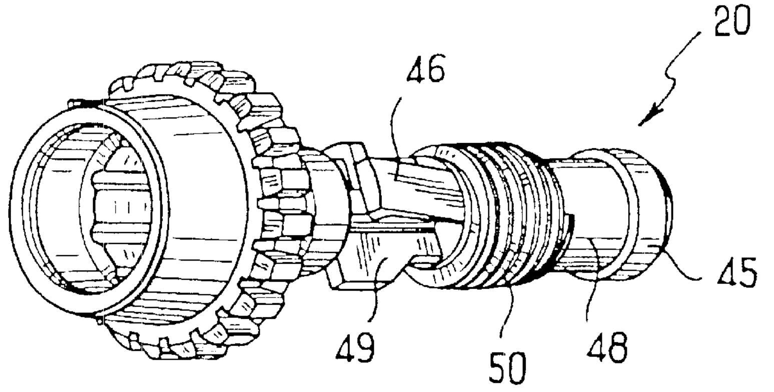
FIGS. 23, 24 and 25 are views in perspective, from the side and in axial section of the adjusting screw of the headlight of FIG. 1.
Figure 24:
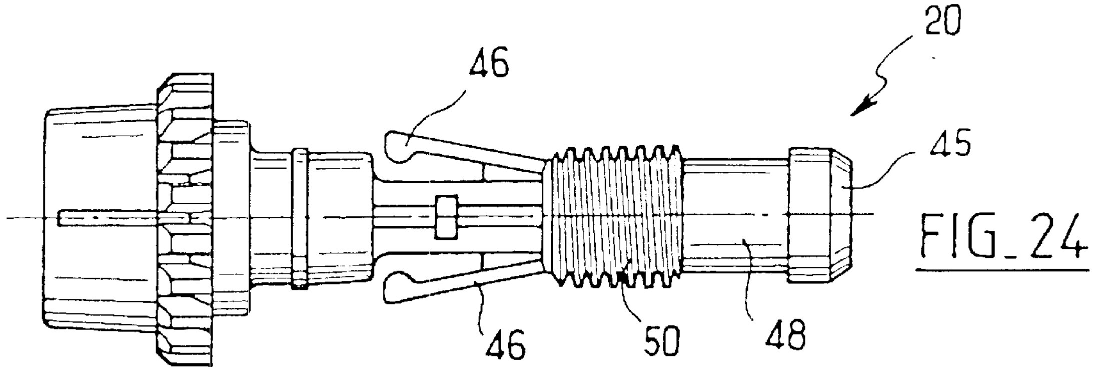
Figure 25:
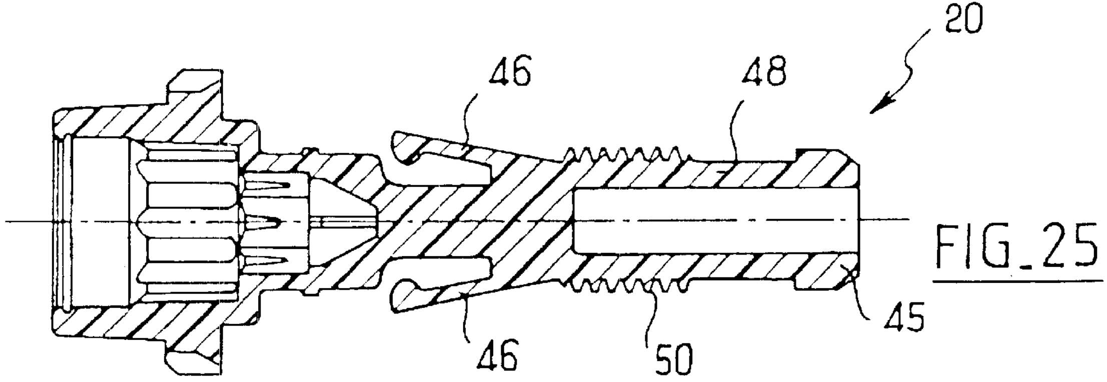
Figure 26:
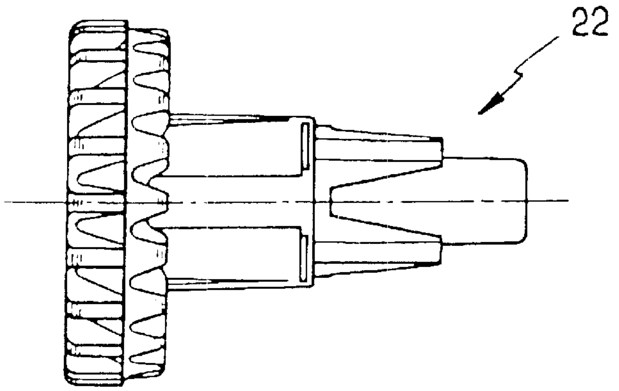
FIG. 26 is a side view of the adjusting knob associated with the screw.

The orifices 42, 44 are suitable for receiving the adjusting screw 20 illustrated in FIGS. 23 to 25. This screw is engaged by its upper end 45 into the lower orifice 44, then as far as into the upper orifice 42. Elastic tabs 46 are linked by their front end to the body 48 of the screw and extend, at rest, stretching away rearwards from the body of the screw. The tabs 46 bend on passing through the orifice 44 then resume their initial position after the screw arrives in its operating position. The clipping tabs thus prevent the screw being withdrawn downwards. The screw is in axial abutment upwards against the bottom of the upper blind orifice 42. The screw is guided in rotation about its axis in the two orifices. Between them, the body of the screw features a threaded portion 50 making it possible to actuate the reflector, as will be described later on. This positioning of the screw guarantees the correct angular position of the thread and thus precise cooperation with the cradle.

The screw features an indexing tab 49 extending radially in projection on only one side of the shank and obliging the screw to be mounted in the correct position on the casing, failing which the screw cannot be accommodated on the casing since the tab abuts against the casing.

The back wall 24 of the casing features a central aperture 52 intended to be occupied by the lamp holder 10.

Figure 10:
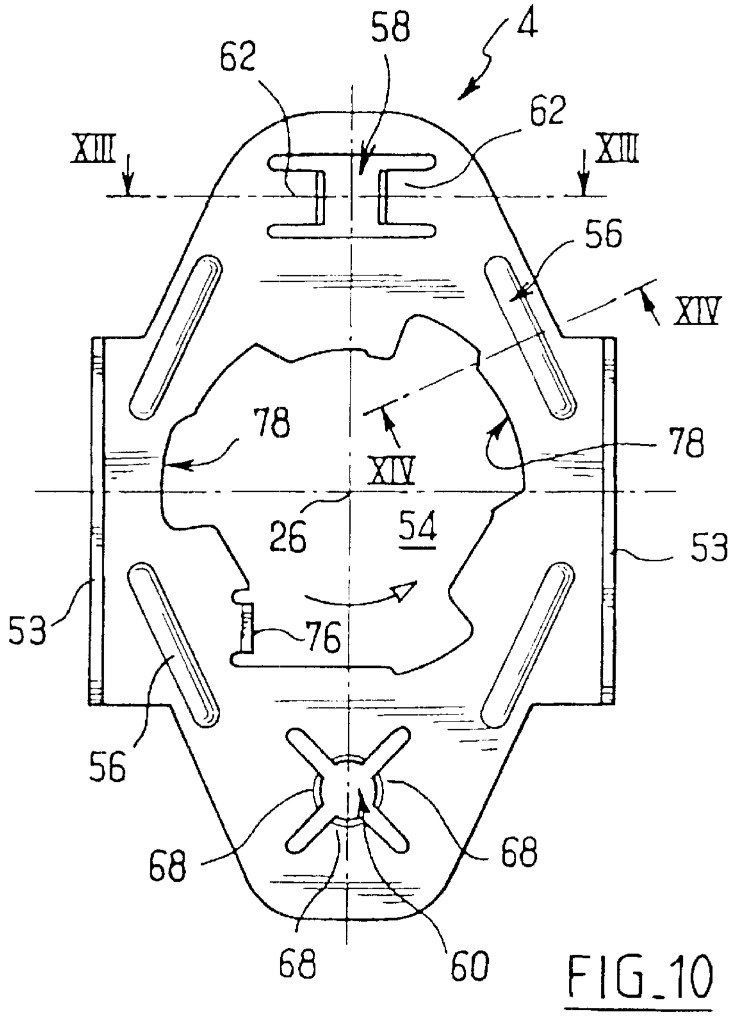

Referring to FIG. 10, the plate 4 has a generally flat, essentially lozenge-shaped form, the major axis of which is vertical. The plate is centered on the axis 26 of the lamp. The plate features two straight-line lateral vertical edges 53 folded forwards and perpendicular to the plane of the plate, extending forwards by about 3 mm. The sheet metal plate 4 features a central aperture 54 of substantially the same shape and the same dimensions as that 52 of the back wall of the casing and coming into coincidence with it. The sheet metal plate 4 is fixed to the back wall 24 opposite the front face. The sheet metal plate is interposed axially between the back wall 24, on the one hand, and the cradle 16 and the reflector 18, on the other hand. The sheet metal plate features stiffening ribs 56, here four in number, in relief on the front face of the sheet metal plate. These ribs are parallel to the respective inclined sides of the lozenge.

Figure 13:
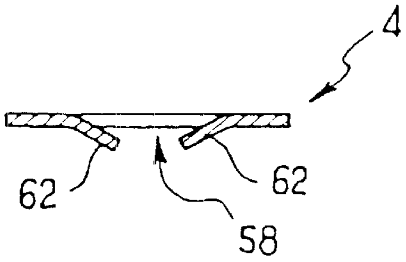
FIGS. 13 and 14 are local views of the sheet metal plate along the planes XIII—XIII and XIV—XIV of FIG. 10.
Figure 14:
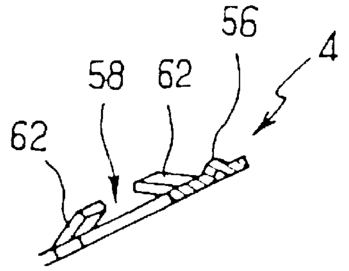
Figure 15:
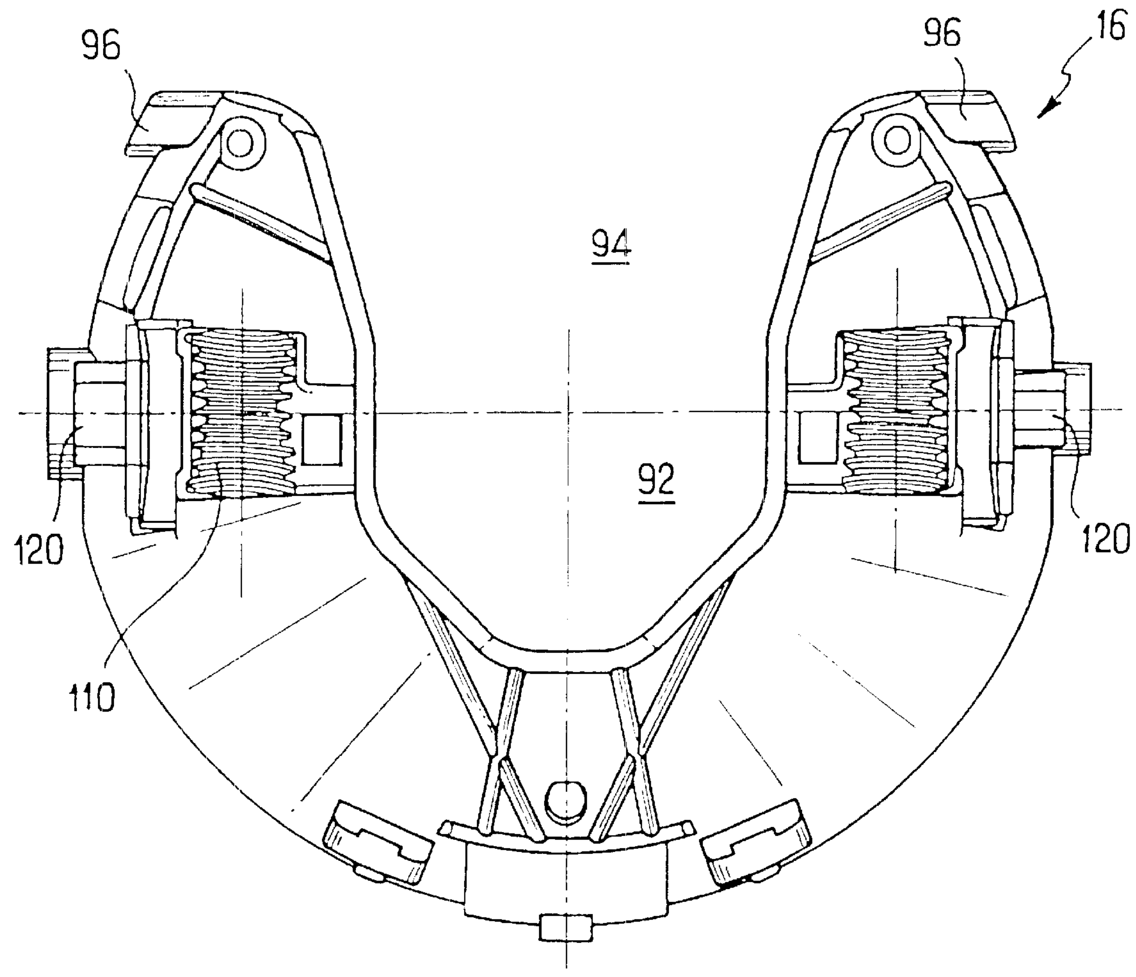
FIGS. 15 and 16 are rear and top views of the cradle of the headlight of FIG. 1.
Figure 16:
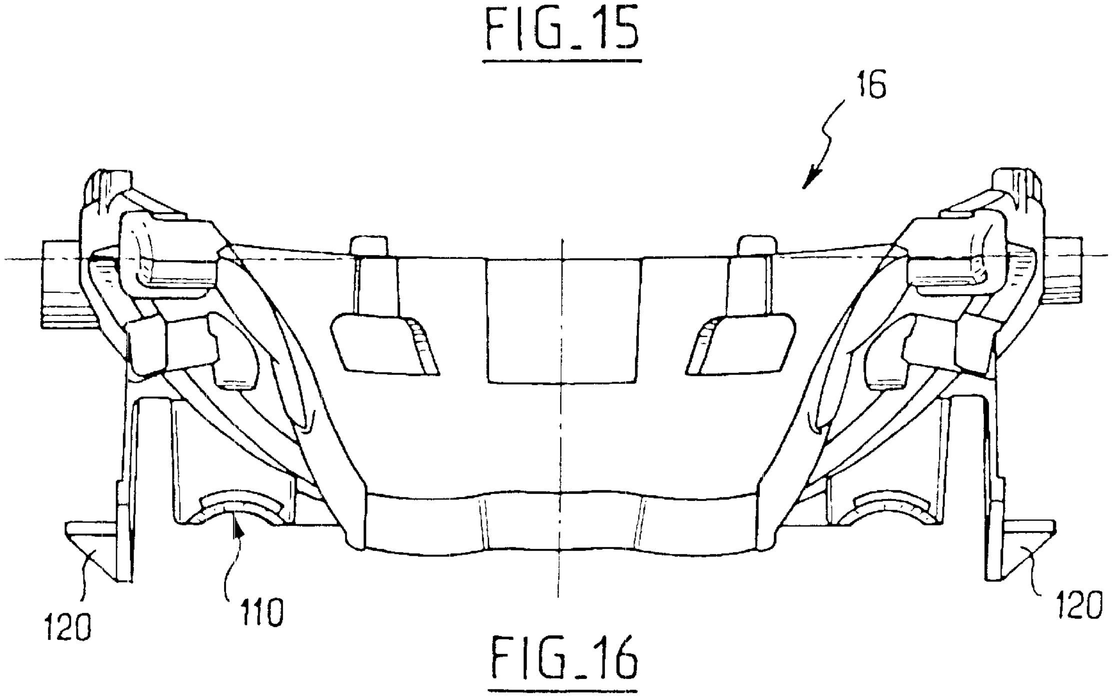
Figure 17:
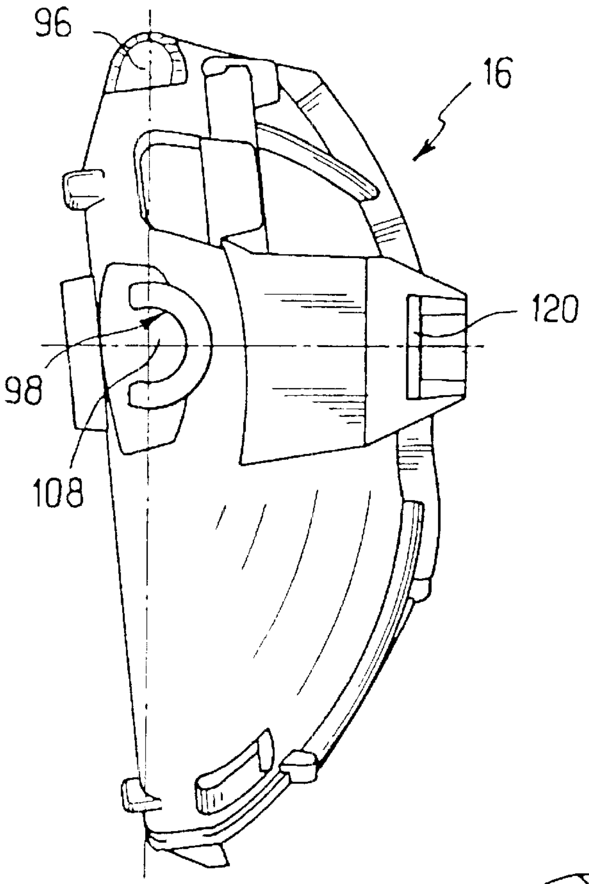
FIGS. 17 and 18 are left and front views of the cradle of FIG. 15.
Figure 18:
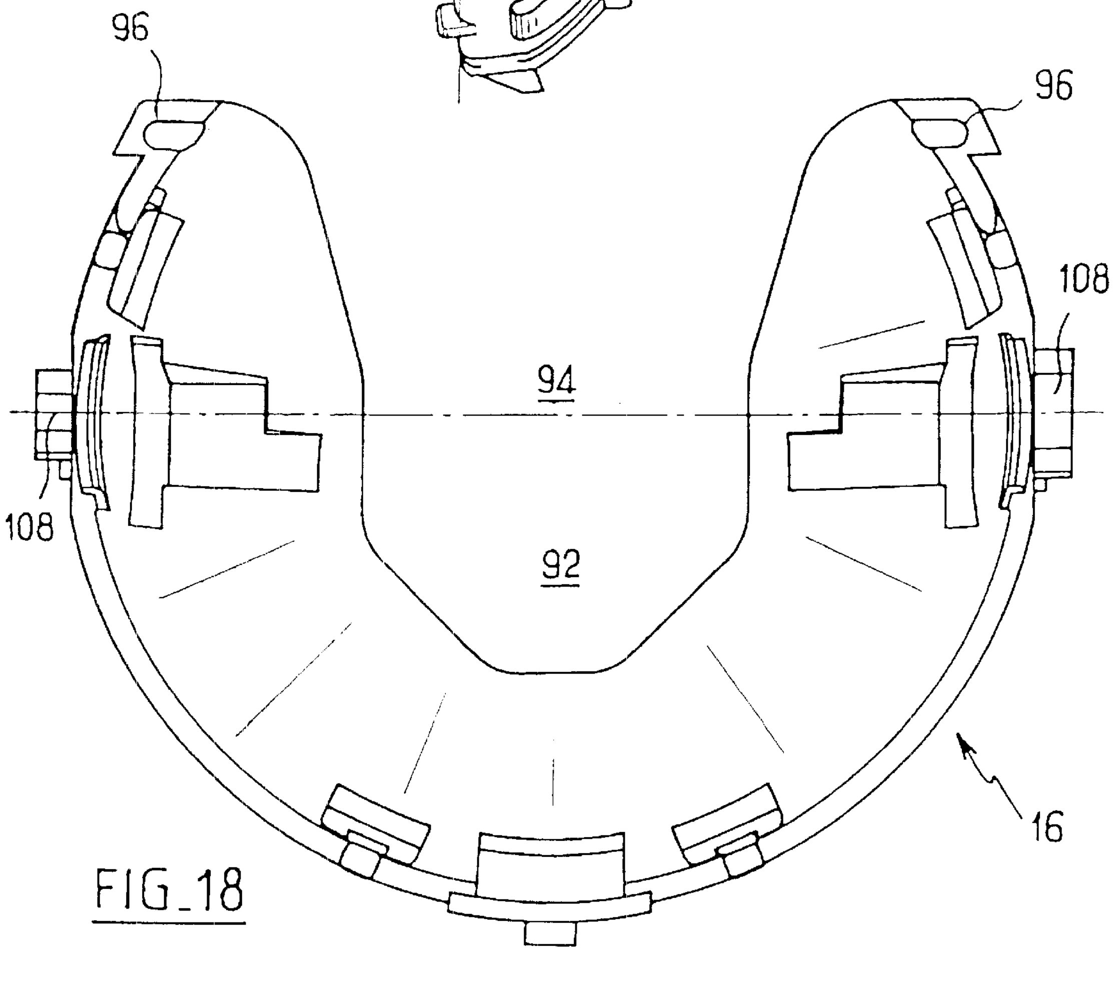

The sheet metal plate features two upper 58 and lower 60 orifices intended to interact with fingers extending forwards in projection from the back wall 24 of the casing. The upper orifice 58 has a reclining "H" shape. It is formed by a rectangular cut-out into which two rectangular prongs 62 extend horizontally, towards one another. These two prongs are slightly inclined forwards, as is shown in FIG. 13. The finger 64 of the casing associated with this orifice has a profiled shape with a square section in a plane perpendicular to the axis 26. It is dimensioned such that, when the sheet metal plate 4 is pressed into position against the back wall 24, the finger 64 penetrates into the orifice 58 between the prongs 62, the lateral faces of the finger rubbing against the prongs or even deflecting them forwards. In contrast, having regard to the forward inclination of the prongs, the friction forces of the prongs on the finger, countering its withdrawal, are much higher than those encountered during its advance. The finger is therefore trapped in the orifice, countering it being withdrawn.

Figure 11:
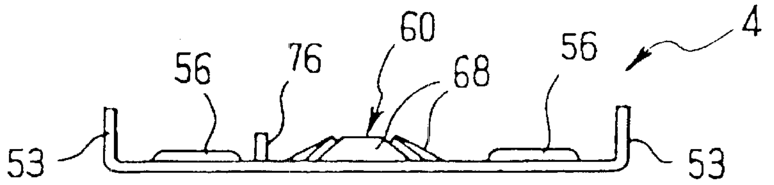
FIGS. 10, 11 and 12 are a front view, a view from below and a view from the left, of the sheet metal plate of the headlight of FIG. 1.
Figure 12:
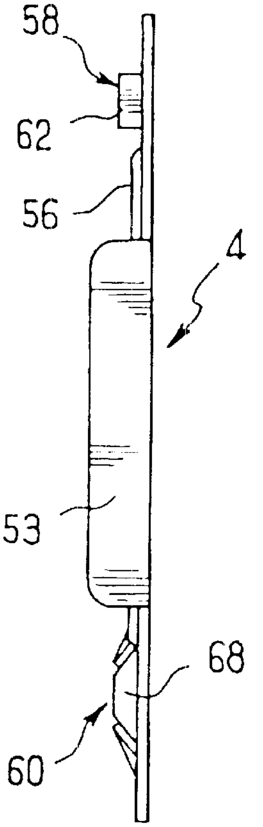

The interaction between the lower orifice 60 and the associated finger 66 is based on the same principle. The finger 66 is of circular cross section. The orifice 60 is cross-shaped, and is defined by four triangular prongs 68 the opposite edges of which form the cross. The tip of the prongs is rounded and concave so as to follow the curvature of the finger. The prongs 68 are again inclined forwards as illustrated in FIG. 11. Here again, the prongs allow the finger 66 to be inserted into the orifice forwards but essentially prevent it being withdrawn. The two pairs of fingers and of orifices provide for the rigid fixing of the sheet metal plate 4 to the back wall 24. The square section of the upper finger 64 is larger than that of the lower finger 66, so that the upper finger 64 cannot be inserted into the lower orifice 60 without abnormal force being used. Moreover, the inclination of the prongs prohibits the sheet metal plate being fixed to the back wall in a position such that the prongs would be inclined rearwards. Thus indexing means are constituted, which oblige the sheet metal plate to be mounted on the casing in the intended unique position.

Referring to FIG. 7, the orifice 52 of the casing features, in essence, three segments in a circular arc 70 of the same radius, alternating with three segments in a circular arc 72 of the same radius which is larger than that of the radii 70. All the segments are centered on the axis 26.

The six segments are distributed into three pairs of adjacent segments for clarity of the explanations which follow. Each pair includes an arc of large radius 72 followed by an arc of small radius 70 by reference to the anti-clockwise direction 69. At the junction between the two segments of each pair, the casing includes a relief 71 extending forwards in projection from the front face of the back wall. This relief 71 features a front helical ramp 73 with axis 26 going away from the back wall in step with the rotation in the direction 69. The back wall further includes a relief 74 extending to the edge of the orifice 52 between two reliefs 72.

The sheet metal plate 4, close to its orifice 54, features a folded edge 76 coming into abutment against the relief 74 counter to the rotation of the plate 4 with respect to the back wall in the direction 69. The circular arcs 78, of large radius, of the sheet metal plate, corresponding to those 72 of the back wall, are longer than the latter so as not to mask the ramps 73, seen from the front.

Figure 6:
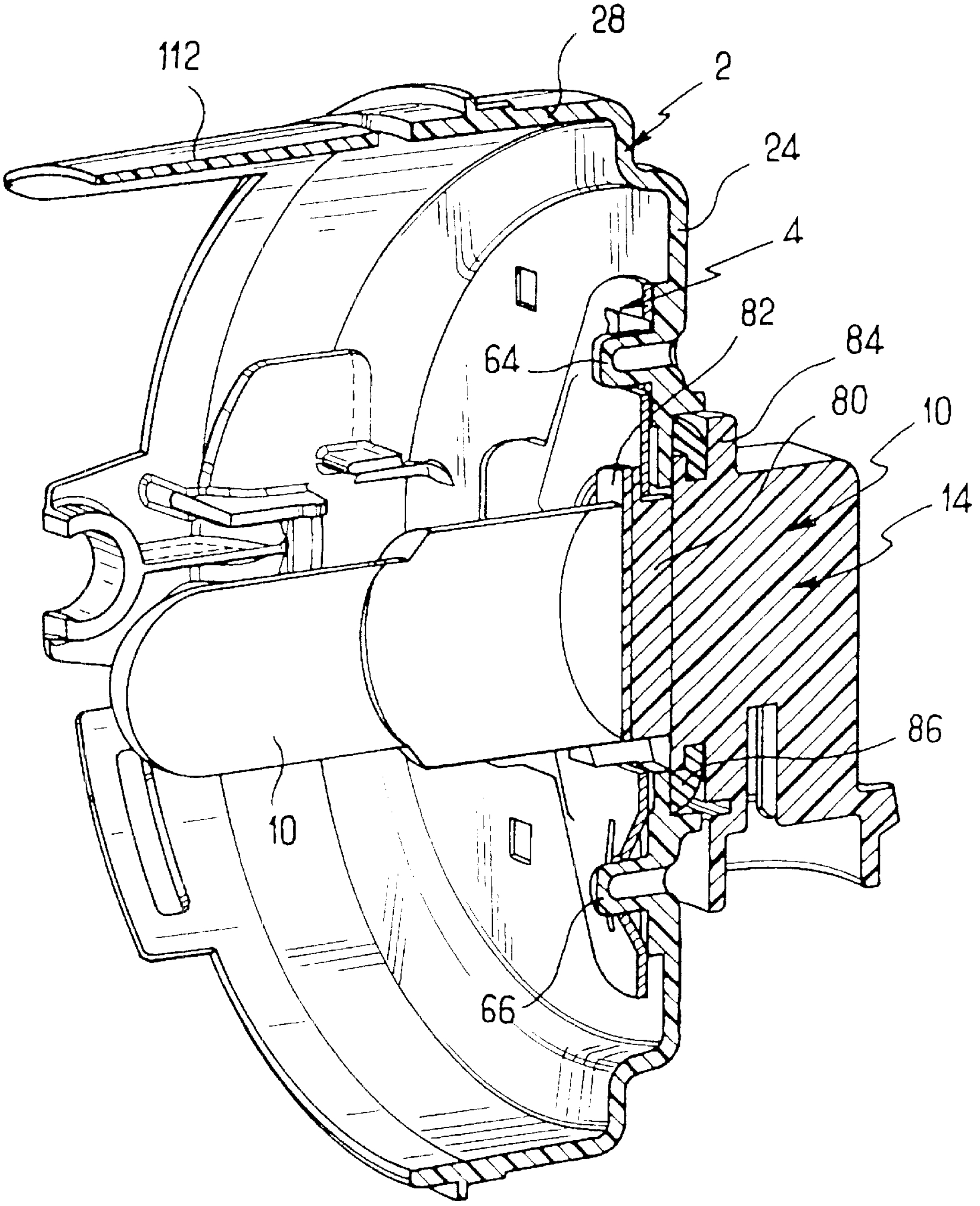
FIG. 6 is a sectional view in simplified perspective of the headlight of FIG. 1.

Referring to FIG. 6, the lamp holder 10 includes a body 80 having a generally axisymmetric shape, and three prongs 82 only one of which, the upper one, is illustrated, extending in radial projection from the periphery of the body. The body 80 includes a double rear collar 84 equipped with a gasket for sealing and taking up play 86.

It is assumed that the lamp holder 10 is carrying the lamp 86 and that the casing 2 is carrying the sheet metal plate 4. In order to fix the lamp holder to the casing, the lamp holder is inserted from the rear into the orifice 52 of the back wall and of the plate until the gasket 86 comes into axial abutment forwards on the rear face of the back wall, the collar 84 itself being in axial abutment against the rear of the gasket. In the course of this movement, the prongs 82 necessarily pass through the opposite orifice of the large-radius circular arcs since they extend radially over too great a length to be able to penetrate opposite the small-radius circular arcs. Moreover, by reason of the presence of the relief 74, one of the locations for the prongs to pass through is smaller than the others. Given that the prongs 82 have dimensions corresponding substantially to those of the through locations, it follows that the lamp holder cannot penetrate into the orifice except in a single angular position around the axis 26 with respect to the casing. Thus, here again an indexing effect is obtained. Once the gasket is in abutment against the back wall, the prongs are located directly opposite the ramps 73. The lamp holder is then pivoted with respect to the casing about the axis 26 in the direction 69. The prongs 82 then follow the ramps 73 so as to manage to push the lamp holder forwards. The prongs finally leave the ramps so as to come into axial abutment on the sheet metal plate 4 in the region of the small-radius circular arcs. One of the prongs 82 comes into rotational abutment against the relief 76 of the sheet metal plate, which blocks the rotation of the lamp holder and defines its final position. Thus, the lamp holder is fixed rigidly to the sheet metal plate 4 and to the casing 2 in a position which is very precisely defined by virtue especially of the rotational guidance of the body 80 of the lamp holder against the small-radius circular arcs.

Figure 19:
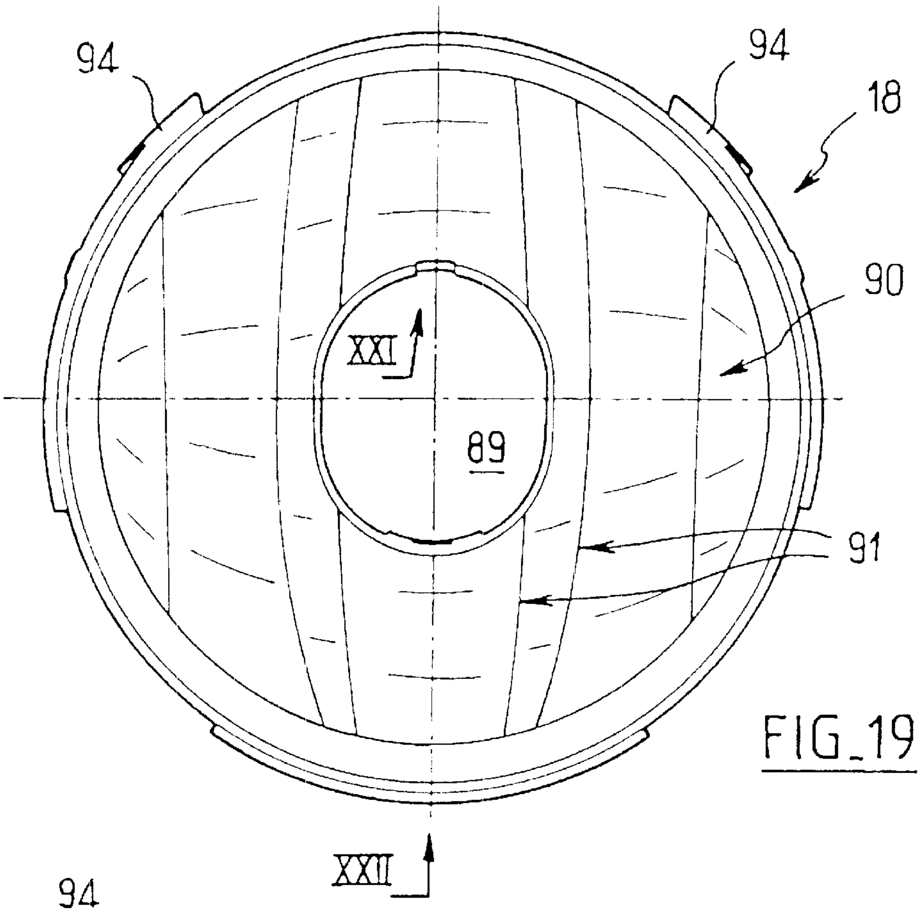
FIGS. 19 and 20 are front and left views of the reflector of the headlight of FIG. 1.
Figure 20:
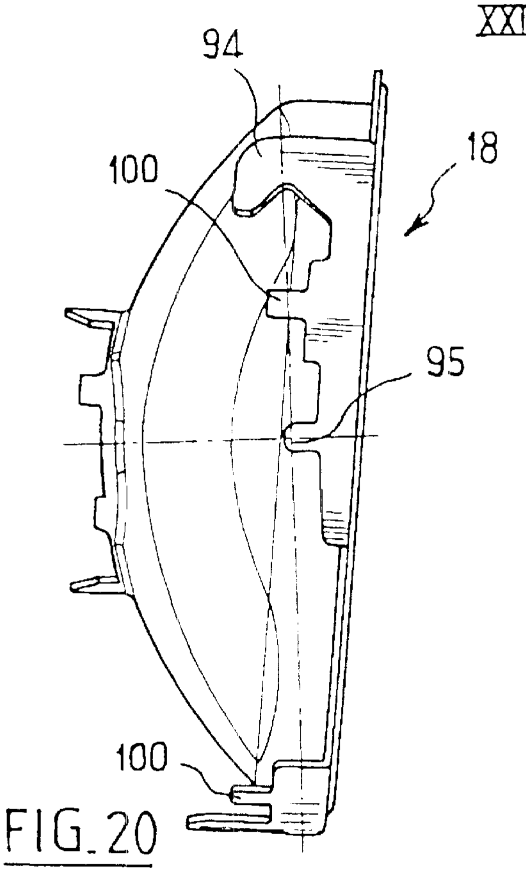
Figure 21:
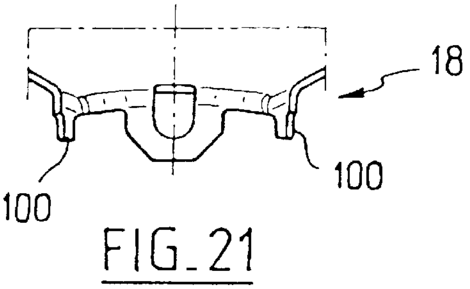
FIG. 21 is a view of the reflector along the arrow XXI of FIG. 19.
Figure 22:
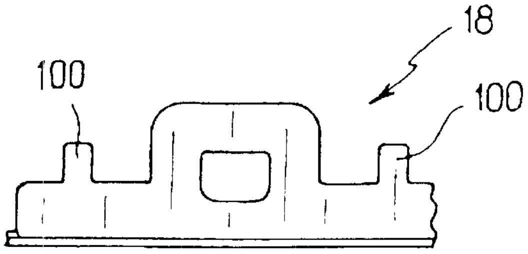
FIG. 22 is a view of the reflector along the arrow XXII of FIG. 19.

Referring to FIG. 19, the reflector has a generally concave shape and features an aperture 89 at its center. Its inner reflecting face 90 exhibits different regions formed by geometrically different paraboloids separated from one another by recessed edges 91.

Referring to FIGS. 15 to 18, the cradle 16 has a shape generally similar to that of the reflector, essentially in concave-hemispherical shape. It also features a central orifice 92 but this one is extended upwards by a notch 94 linking the central orifice 92 to the peripheral edge of the cradle in such a way that the latter is generally "U" shaped seen from the back or the front. The "U" is essentially solid, apart from the notch 94 and the orifice 92.

The reflector 18 is fixed rigidly to the cradle 16 in coaxial position. The means of positioning comprise two lateral upper hooks 94 for fixing the reflector, oriented downwards and bearing on two reliefs 96 of the cradle which are contiguous with the notch 94. They also comprise two left and right tabs 95 for positioning the reflector which are accommodated rearwards in two corresponding housings 98 of the cradle. The two tabs 95 differ from one another, as do the housings 98, in such a way that the reflector can only be fixed in one position with respect to the cradle. They further include four tabs 100 of the reflector, which are crimped by being folded radially inwards into the cradle, and finally a lower clipping tab 102 of the reflector to be clipped onto a lower stud 104 of the cradle. These various means ensure robust and precise fixing of the reflector to the cradle.

In order to fix the cradle to the reflector, the reliefs 96 of the cradle are engaged under and in the hooks 94 of the reflector, the cradle being inclined with respect to the reflector. Then the cradle is folded back towards the reflector, their lower parts being brought together in order to remove the inclination, the tab 95 penetrating into the housings 98 of the cradle and the tabs 102 clipping onto the stud 104 of the reflector. This fixing is already rigid. In order to reinforce it, the tabs 100 of the reflector are folded into the cradle. The fixing is thus particularly robust. Assembly with prior rotational movement is made possible by the space left free by the notch 94.

The casing includes two cylindrical housings 106 able to accommodate the reliefs 98 of the cradle which have a corresponding shape for guidance of the cradle in rotation with respect to the casing about a horizontal axis 108 perpendicular to that 26 of the lamp but extending under that axis. The cradle includes two studs 120 extending rearwards and able to come into engagement by clipping with two reliefs 122 of the inner face of the side wall of the casing, in such a way that the cradle, pushed axially into the casing rearwards, is retained by clipping. The reliefs 122 have a curved shape with a center of curvature directed forwards, as illustrated in FIG. 9, so as to allow the cradle 16 to be rotated with respect to the casing 2 despite this fixing. The two reliefs 98 are different from one another, as are the housings 106 for an indexing effect obliging the cradle to be mounted on the casing in the intended unique position, namely notch 94 upwards.

In their approach towards the relief 122, the studs 120 are guided by a groove 123 of the casing featuring one extremity flared towards the front.

The cradle, on its rear face, features a threaded indentation 110 of generally cylindrical hollow shape configured in such a way that this indentation comes into engagement with the thread 50 of the adjusting screw 20 when the cradle is in position. When the adjusting screw is made to turn about its axis, for example by means of the knob 22 which extends it at the lower part, the reflector 16 is therefore caused to pivot upwards or downwards about the axis 108. The threads of the screw 20 and of the cradle 16 are configured with sufficient clearance for the rotation of the cradle over a small angle not to interrupt the engagement of the threads. Moreover, the indentation 110 of the cradle has a slightly convex profile in vertical section passing through the axis of the thread.

Figure 27:
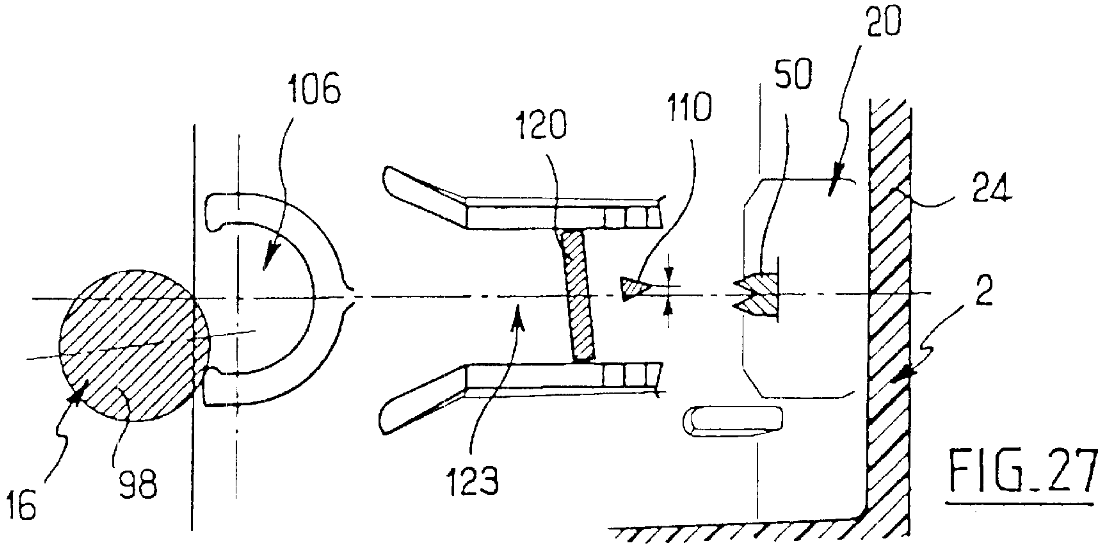
FIGS. 27, 28 and 29 show three stages of the kinematics for assembling the cradle onto the casing.
Figure 28:
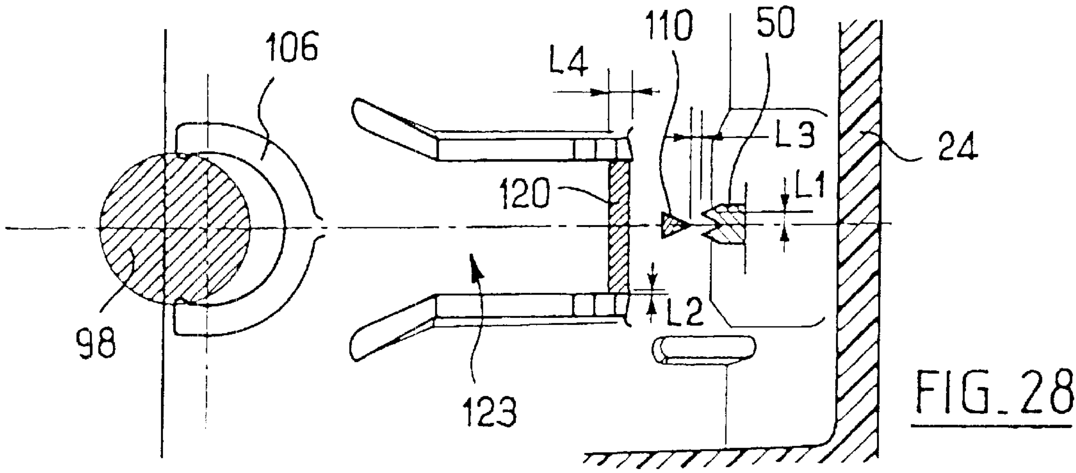
Figure 29:
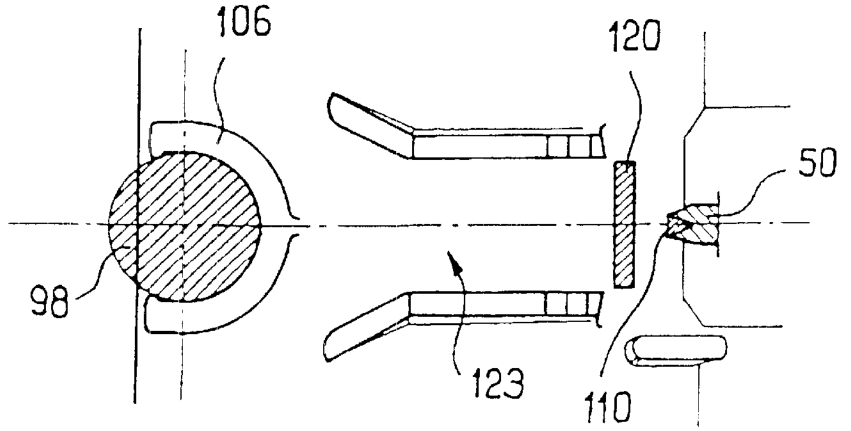

The kinematics for assembling the cradle onto the casing are illustrated in FIGS. 27 to 29.

When the cradle is brought closer to the casing, the studs 120 are guided in the grooves 123 before the reliefs 98 are received into the housings 106 (FIG. 27). When the reliefs 98 arrive in the housings 106, the studs are still in the grooves (FIG. 28). At that instant, the axis of the cradle is already positioned suitably with respect to that of the casing. Moreover, the vertical clearance L2 between the stud and the groove is less than the vertical clearance between the threads 110 and 50. Moreover, the horizontal distance L3 between the crests of the thread 100 and the crest of the thread 50 is less than the distance L4 remaining for the stud to travel to leave the groove.

When the reliefs are received into the housings 106 as in FIG. 29, the threads 50 and 110 are in mutual engagement but the studs 120 have left the grooves, allowing the cradle to pivot with respect to the casing by control from the screw. It is seen that this arrangement assures that the cradle arrives on the casing in the appropriate position.

Figure 5:
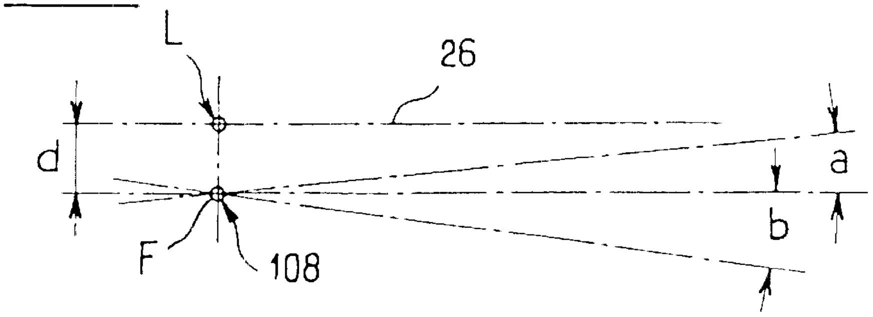
FIG. 5 is a geometric diagram illustrating the angular excursion of the reflector.

FIG. 5 illustrates the movement of the cradle 16 with respect to the casing 2. The cradle may be inclined here from the horizontal by an angle a of 5.5° upwards and by an angle b of 7.5° downwards so as to correct the angle of the beam of the headlight by reference to the actual attitude of the vehicle. The focus F of the reflector 18 is situated on the axis of pivoting 108 vertically in line with the axis 26 of the lamp and of the casing. The vertical distance d separating them is very much reduced, for example 0.7 mm. L designates the center of the filament in FIG. 5. The lower generatrix of the horizontal cylindrical filament extending from front to back has its center substantially at the focus F.

Figure 4:
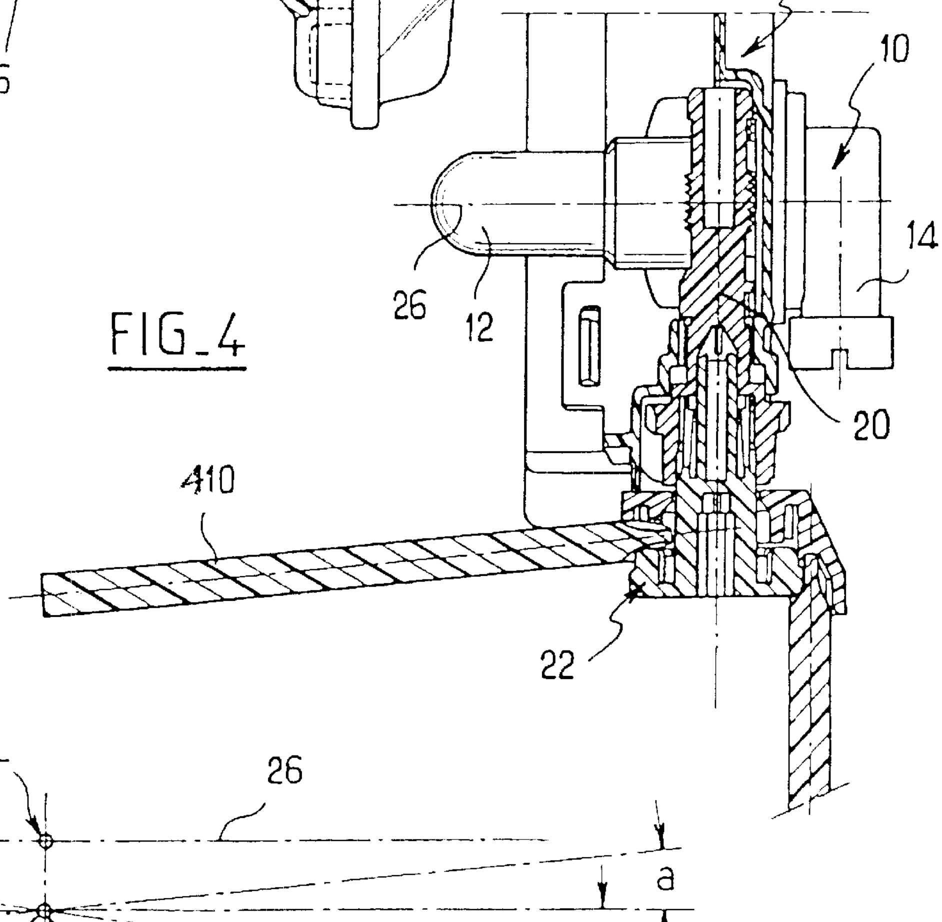
FIG. 4 is a view similar to FIG. 3 showing the actuating of the adjusting screw.

Referring to FIG. 4, the knob 22 features a circular toothing oriented upwards allowing it to be meshed with an elongate toothed element 410 such as a cross-head screwdriver for actuation of the adjusting screw 20 and adjustment of the attitude, for example manually or automatically, from the dashboard. The actuating by means of the screwdriver can be performed horizontally, from the front or the side, for example, or vertically from below as illustrated in FIG. 4.

Referring to FIGS. 6 to 9, the casing includes a screen or visor 112 of cylindrical shape, with axis 26, made integrally with the side wall 28 of the molded casing. The upper and lower faces of the screen are in the extension of the outer and inner faces of the side wall of the casing. The screen extends in projection from the front edge 30 forwards, towards the glazing 8. The screen 112 extends over an angular sector about the axis 26 less than 90° and here equal to 66°.

The intermediate piece 6 features a cylindrical skirt with axis 26 fixed by its rear edge to the outside of the side wall 28 of the casing and carrying the glazing by its front edge.

Referring to FIG. 1, the screen 112 is interposed radially between the lamp 12, under the screen, and the intermediate piece 6 on the screen. The screen extends further forwards than the lamp. The screen protects the intermediate piece as regards the air heated by the lamp which rises into the internal enclosure of the headlight.

The sheet metal plate 4 will, for example, be of zinc-plated steel.

The glazing 8 could be of annealed glass.

The intermediate piece 6, the casing 2, the cradle 16, the adjusting screw 20 and the knob 22 could be of PBT (polybutylene terephthalate), a plastic which has good heat resistance.

The lamp is, for example, a lamp of Philips/Osram/GE make, of type H 11.

The reflector 18 here is of aluminum/steel alloy plate.

A shade 130 could be provided on the lamp 12, made of a material with the "ALUZI" trademark.

The gasket 86 is of silicone.

Needless to say, many modifications could be applied to the invention without departing from the scope thereof.

Provision could be made for the screen 112 to be a piece which is attached, for example to the casing 2 or the intermediate piece 6.

The device could be a signaling lamp.

What is claimed is:

1. Lighting or signaling device for a vehicle including a casing, glazing and an intermediate piece linking the glazing to the casing; and a screen extending forwards from an upper region of the casing towards the glazing, the screen being linked directly to the casing so forming a single piece with the casing.

2. Device according to claim 1, wherein the screen is molded integrally with the casing.

3. Device according to claim 1, wherein the screen and the casing each feature an inner and an outer face, at least one of the inner and outer faces of the screen being in the extension of the corresponding face of the casing.

4. Device according to claim 1, wherein the screen has a generally cylindrical shape.

5. Device according to claim 1, wherein the screen extends over an angular sector of less than 90° around an axis of the device.

6. Device according to claim 1, comprising a plastic back wall, a lamp holder fixed to the back wall, and a metal plate fixed to the back wall.

7. Device according to claim 1, comprising a reflector and a cradle linking the reflector to the casing and featuring an aperture in the upper part.

8. Device according to claim 1, comprising a headlight.

9. Device according to claim 1, comprising a fog lamp.

* * * * *